(12) United States Patent
Bruno et al.

(10) Patent No.: US 6,186,056 B1
(45) Date of Patent: Feb. 13, 2001

(54) MACHINE TOOL FOR PROCESSING PRODUCTS INCLUDING FOOD PRODUCTS

(75) Inventors: Babut Bruno; Musseau Joël, both of Aubusson (FR)

(73) Assignee: Dito Sama, Aubusson (FR)

( * ) Notice: Under 35 U.S.C. 154(b), the term of this patent shall be extended for 0 days.

(21) Appl. No.: 09/340,205

(22) Filed: Jun. 28, 1999

(30) Foreign Application Priority Data

Jun. 29, 1998 (FR) .................................................. 98 08241

(51) Int. Cl.[7] ................................ A23L 1/00; A47J 27/00; B01F 7/16; B01F 7/20
(52) U.S. Cl. ............................. 99/348; 99/645; 366/129; 366/251; 366/279; 366/282; 366/605
(58) Field of Search ...................... 99/348, 345; 366/129, 366/279, 130, 83, 251, 144–147, 197, 344, 601, 342, 140, 282, 605; 219/227, 228, 201, 241, 523, 533; 416/63, 35, 95, 76, 122, 176, 146 R; 241/282.2, 199.9, 65, 100

(56) References Cited

U.S. PATENT DOCUMENTS

| 1,946,840 | * | 2/1934 | Cox | 366/146 |
| 2,805,050 | * | 9/1957 | Choppinet | 366/129 |
| 2,843,169 | * | 7/1958 | Stein | 366/140 |
| 3,299,924 | * | 1/1967 | Hanschitz | 366/129 |
| 3,589,834 | * | 6/1971 | Calrelli | 366/83 |
| 4,955,288 | * | 9/1990 | Chen | 99/348 |
| 5,052,593 | | 10/1991 | Grome et al. . | |
| 5,073,033 | * | 12/1991 | Klepeis | 366/343 |
| 5,368,384 | | 11/1994 | Duncan et al. . | |
| 5,617,774 | * | 4/1997 | LaVelle et al. | 99/348 |

FOREIGN PATENT DOCUMENTS

| 629800 | 7/1963 | (BE) . |
| 315830 | 10/1956 | (CH) . |
| 2147495 | 3/1973 | (FR) . |

* cited by examiner

Primary Examiner—Timothy F. Simone
(74) Attorney, Agent, or Firm—Sughrue, Mion, Zinn, Macpeak & Seas, PLLC

(57) ABSTRACT

A machine tool for processing products, such as food products. The tool includes a tube-envelope (2) fixed to the tool with a cage (6) at one end of the tube-envelope. In one embodiment of the invention, the tube-envelope and the cage are formed as two separate parts. The cage (6) receives a product processing unit (7). The product processing unit (7) is, for example, a blade, which is driven by a shaft (9) releasably coupled to a drive shaft (12) of the machine. The shaft (9) is guided and centered in the tool. The shaft is sealed in the machine with, for example, a ring, and the ring can be screwed into the tube-envelope, or secured to the machine by bayonets. The ring is formed so that it is removable with a tool. This allows for the shaft (9) and processing unit (7) to be demounted from the tool for maintenance.

12 Claims, 2 Drawing Sheets

MACHINE TOOL FOR PROCESSING PRODUCTS INCLUDING FOOD PRODUCTS

BACKGROUND OF THE INVENTION

The present invention concerns a machine tool for processing products including food products.

The invention relates more particularly to a machine tool for cutting and/or mixing products, for example, also known in the art as a mixer.

The tool of a machine of the above kind generally includes a tube-envelope provided at a first end with means for fixing it to the remainder of the machine and at a second end with a cage for receiving a product processing unit, for example a blade, carried by a first end of a shaft in the tube-envelope for driving the tool in rotation and whose second end includes means for releasably coupling it to a drive shaft of the machine and means in the tube-envelope and near the end thereof nearest the processing unit for guiding and centering the shaft for driving rotation of the processing unit.

One weakness of the above type of machine is insufficiently reliable sealing of the means for centering and guiding the shaft, which leads to penetration of the product into the tube-envelope, which causes contamination of the tool or even deterioration of the centering and guide means.

Thorough cleaning of the tool is particularly difficult because of its structure and conditions of use.

Various prior art systems which attempt to solve these problems have already been proposed.

For example, in some tools the product processing unit is removable.

It has already been proposed, in other tools, to make the tube-envelope in two portions fixed to each other by removable fixing means, to provide easier access to the centering and guide means.

None of the above solutions is as yet satisfactory, however.

The aim of the invention is therefore to solve the above problems.

SUMMARY OF THE INVENTION

The invention consists of a machine tool for processing products including food products, including a tube-envelope provided at a first end with means for fixing it to the machine and at a second end with a cage for receiving a product processing unit carried by a first end of a shaft in the tube-envelope for driving rotation thereof and whose second end includes means for releasably coupling it to a drive shaft of the machine and means in the tube-envelope near the end thereof nearest the processing unit for guiding and centering the shaft for driving rotation of the processing unit, characterized in that the means for centering and guiding the drive shaft are joined to the remainder of the tool by fixing means adapted to be removed by the machine operator to enable them to be demounted and therefore to enable the drive shaft to be demounted from the remainder of the tool for maintenance.

BRIEF DESCRIPTION OF THE DRAWINGS

The invention will be better understood from the following description, which is given by way of example only and with reference to the accompanying drawings, in which.

In the figures, identical or similar parts are designated by the same reference numbers.

DESCRIPTION OF PREFERRED EMBODIMENTS

Figure 1:
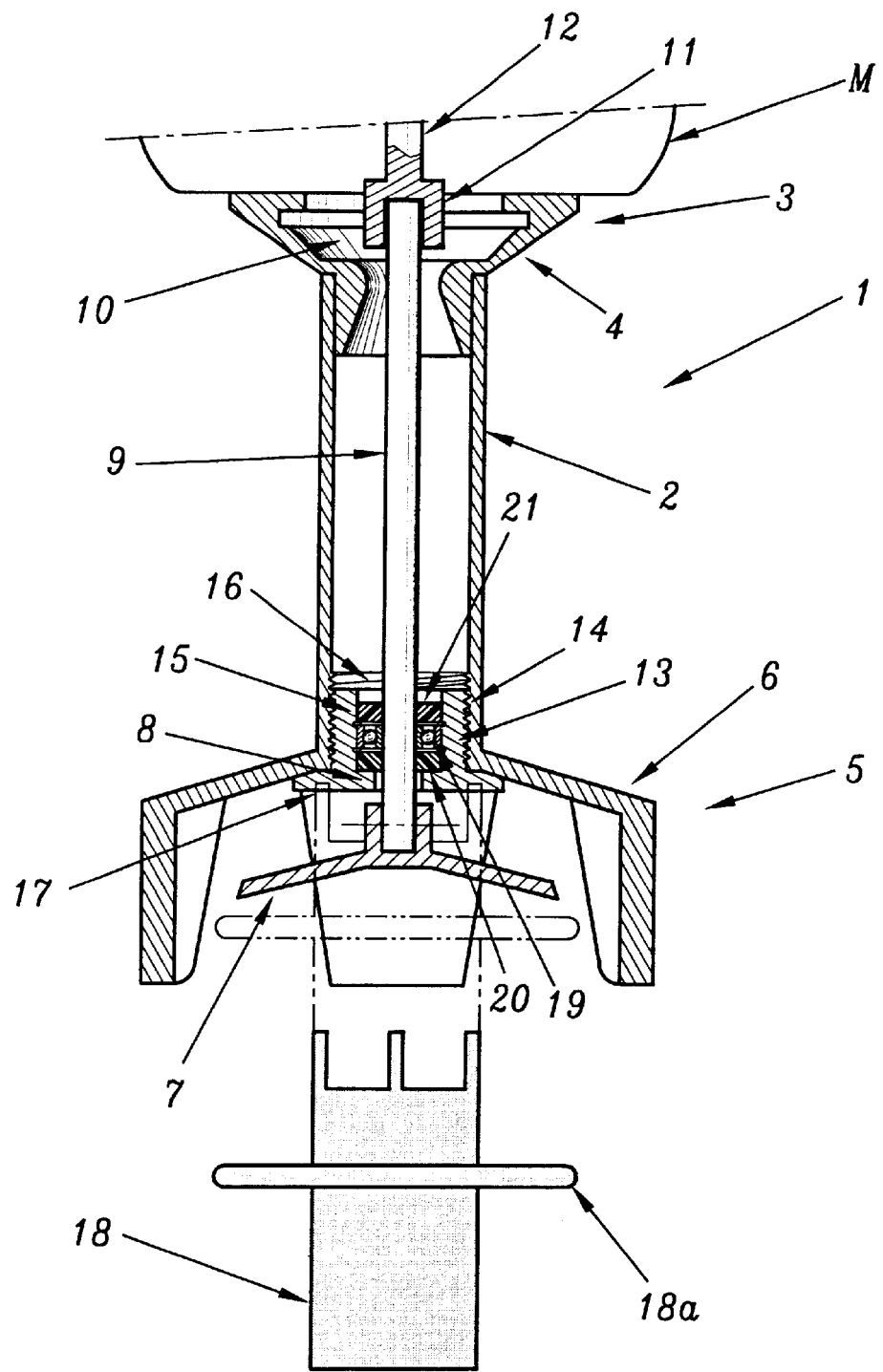
FIG. 1 is a diagrammatic sectional view showing a first embodiment of a machine tool in accordance with the invention.

The figures therefore show a machine tool 1 for processing products including food products, for example.

The tool conventionally includes a tube-envelope 2 provided at a first end 3 with means 4 for fixing it to the machine M, for example removable fixing means.

The tube-envelope has a cage 6 at a second end 5 to receive a product processing unit 7, this unit being in the form of a blade for cutting the product, for example.

The processing unit 7 is carried by a first end 8 of a shaft 9 in the tube-envelope 2 for driving the unit in rotation, whose second end 10 includes means 11 for releasably coupling it to a drive shaft 12 of the machine M, for example.

Means 13 for centering and guiding the shaft 9 in the tube-envelope for driving the processing unit in rotation are also provided in the vicinity of the end thereof nearest the processing unit 7.

In accordance with the invention, the means 13 for centering and guiding the guide shaft 9 are connected to the remainder of the tool by removable fixing means 14 to enable them and therefore the drive shaft to be removed from the remainder of the tool for maintenance.

In the embodiment shown in FIG. 1, for example, the cage 6 receiving the product processing unit 7 is attached to the tube-envelope and is in one piece with the remainder of the tube-envelope 2 and the centering and guide means 13 include a ring 15 whose inside face is provided with means 16 forming a sealed bearing which receives the shaft 9 and whose outside face is provided with means 14 for removably fixing it to the remainder of the tool.

In this embodiment the removable fixing means 14 are between the ring 15 and the tube-envelope 2 and the removable fixing means 14 include means for screwing the ring into the tube-envelope and unscrewing it therefrom, for example.

The ring 15 may include coupling imprints for example, like the imprint 17 in this figure, adapted to cooperate with a retractable tool 18 for mounting/demounting it in the tube-envelope and which can be manipulated by an operator, for example, the tool including safety means to prevent the processing unit injuring the operator, for example in the form of a guard 18a therefor.

It goes without saying, of course, that other embodiments of the means 14 for removably fixing the ring 15 into the tube-envelope 2 are feasible.

Such means may include bayonet means or other means, for example.

When the operator wishes to clean the tool 1 after use, he demounts the ring 15 from the tube-envelope 2, using the tool 18 to unscrew it, for example.

Once the ring has been unscrewed, it can be extracted from the tube-envelope, entraining the processing unit such as the blade 7 and the drive shaft 9 to enable thorough cleaning of the tube-envelope, on the one hand, and the processing unit, the shaft and the means for centering and guiding it in the tube-envelope, on the other hand.

Note also that the means 16 forming the sealed bearing receiving the shaft can include rolling means 19 and sealing means 20 and 21 on respective opposite sides thereof, for example.

The rolling means and the sealing means can have any appropriate structure.

When the various parts have been cleaned, the operator can then engage them inside each other again and screw or otherwise fix the ring 15 in position in the tube-envelope for further use of the tool.

Figure 2:
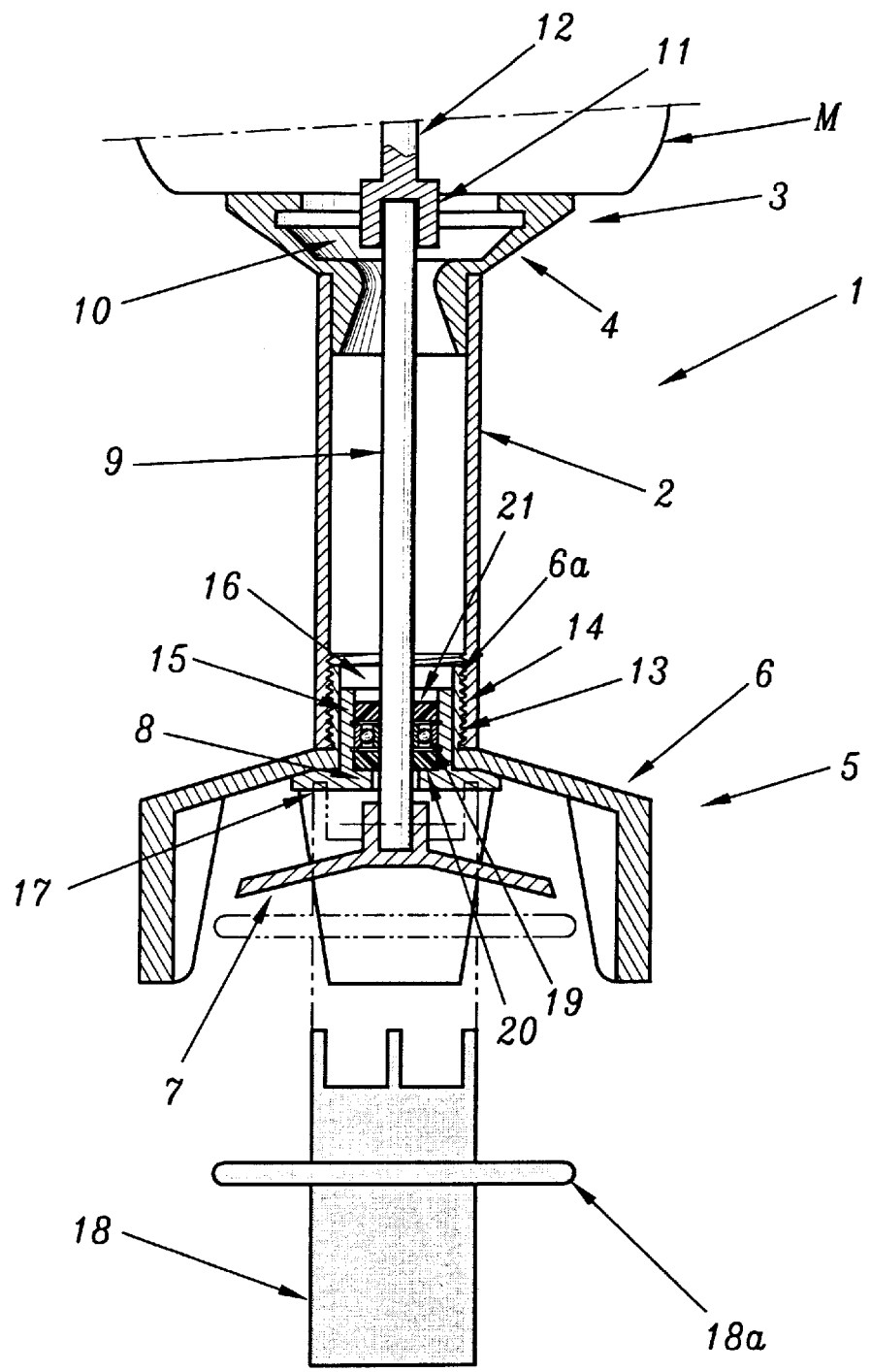
FIG. 2 is a diagrammatic sectional view showing a second embodiment of a machine tool in accordance with the invention.

Of course, it goes without saying that other embodiments of a tool of the above kind are feasible, like that shown in FIG. 2.

The essential difference between the embodiment shown in FIG. 2 and that shown in FIG. 1 is that in the FIG. 2 embodiment the tube-envelope 2 and the cage 6 receiving the product processing unit are in the form of two separate parts. In this embodiment the cage 6 has a portion 6a in the form of a tubular sleeve adapted to engage in the tube-envelope 2 and whose inside face is adapted to receive the ring 15, for example, and is provided with the means 16 forming a sealed bearing to receive the shaft, the outside face of the tubular sleeve portion 6a including means 14 for removably fixing it to the tube-envelope 2 of the tool.

In this case, when the tool is demounted, the cage 6, the ring 15 and the drive shaft 9 are demounted from the remainder of the tool.

Of course, other embodiments are feasible.

For example, the ring 15 can be in one piece with the tubular sleeve portion 6a of the cage 6.

Similarly, centering and guide means can be provided between the second end of the drive shaft and the first end of the tube-envelope, in the conventional way.

What is claimed is:

1. A machine tool for processing products, including food products, comprising:

(a) a tube-envelope (2);

(b) means (4) for fixing said tube-envelope (2) to a first end (3) of the tool;

(c) a cage (6) provided at a second end (5) of said tube-envelope (2);

(d) a product processing unit (7), insertable into said cage (6), and carried by a first end (8) of a shaft (9);

(e) means (11) for releasably coupling a second end of said shaft (9) to a drive shaft (12) of the machine, said drive shaft (12) used with said shaft (9) for driving rotation of said processing unit (7);

(f) means (13) positioned in the tube-envelope (2), and located near the processing unit (7) for guiding and centering the shaft (9);

(g) fixing means (14) for joining said means (13) to the tool (2), said fixing means (14) enabling said means (13) to be demounted from the tool and accordingly, the drive shaft (12), the shaft (9), and the processing unit (7), to be demounted from the tool for cleaning and maintenance.

2. A tool according to claim 1 wherein means (13) comprise a ring (15), said ring (15) comprising an inside face provided with means (16) for forming a sealed bearing to receive the shaft, and an outside face provided with the fixing means (14) for removably fixing said ring (15) to the tool.

3. A tool according to claim 2 wherein the fixing means (14) are located between the means (16) for forming a sealed bearing to receive the shaft and the tube-envelope (2).

4. A tool according to claim 1 wherein the tube-envelope (2) and the cage (6) are two separate parts, the cage (6) having a tubular sleeve (6a) adapted to engage in the tube-envelope (2) and, an inside face of said tubular sleeve (6a) is adapted to receive means (13).

5. A tool according to claim 2 wherein the ring (15) includes means (17) for coupling said ring (15) to a retractable tool (18) for mounting/demounting said ring (15) in the tube-envelope (2).

6. A tool according to claim 2 wherein the means (16) forming the sealed bearing include rolling means (19) for the shaft and sealing means (20, 21) on respective opposite sides thereof.

7. A tool according to claim 1 wherein the fixing means (14) include screwing/unscrewing means.

8. A tool according to claim 1 wherein the fixing means (14) include bayonet means.

9. A tool according to claim 4 characterized in that the means (13) comprise a ring (15), said ring (15) comprising an inside face provided with means (16) for forming a sealed bearing to receive the shaft, and an outside face provided with the fixing means (14) for removably fixing said ring (15) to the tool.

10. A tool according to claim 3 wherein the ring (15) includes means (17) for coupling the ring (15) to a retractable tool (18) for mounting/demounting the ring (15) in the tube-envelope (2).

11. A tool according to claim 9 wherein the ring (15) includes means (17) for coupling the ring (15) to a retractable tool (18) for mounting/demounting the ring (15) in the tube-envelope (2).

12. A tool according to claim 9 wherein the means (16) forming the sealed bearing include rolling means (19) for the shaft and sealing means (20, 21) on respective opposite sides thereof.

* * * * *